Dec. 27, 1938.  C. R. CARR  2,141,512
FEED REGULATOR FOR COTTON LINTER HOPPERS
Filed March 16, 1936
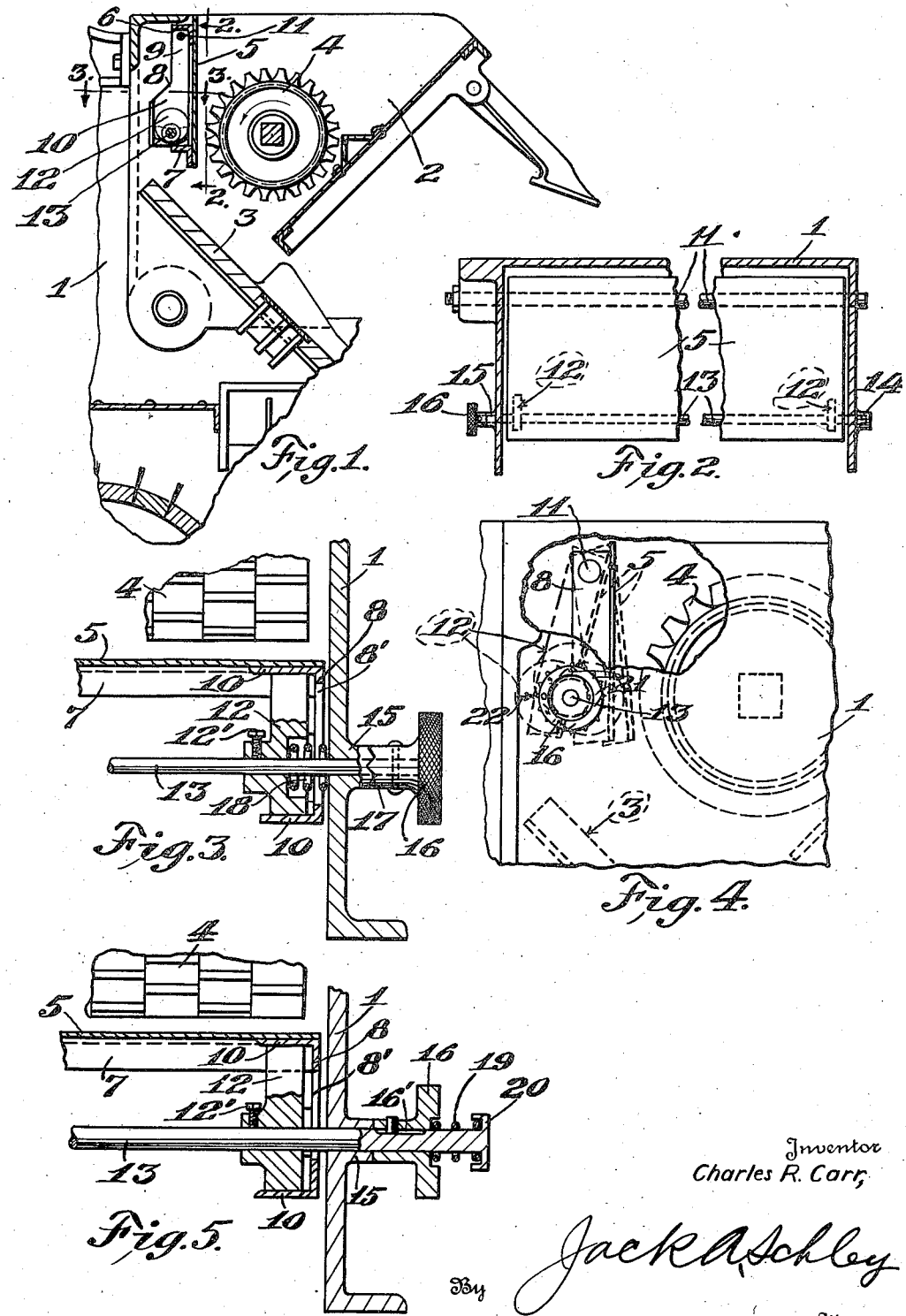

Patented Dec. 27, 1938

2,141,512

UNITED STATES PATENT OFFICE 2,141,512

FEED REGULATOR FOR COTTON LINTER HOPPERS

Charles R. Carr, Dallas, Tex., assignor to The Murray Company, Dallas, Tex., a corporation of Texas Application March 16, 1936, Serial No. 69,022

3 Claims. (Cl. 221—136)

This invention relates to feed regulators for cotton linter hoppers.

In machines for delinting cotton seed a receiving hopper is usually provided to receive therein cotton seed which has already been stripped of the major portion of the cotton fiber in the regular ginning process but still retaining a substantial quantity of relatively short yet valuable fiber, or lint, as it is commonly termed, that is not taken off with the more staple and valuable longer fiber for which the treating devices of the gin are peculiarly adapted. In delinting the partially stripped seeds they are fed into a specially adapted machine through a restricted throat or feed opening from the receiving hopper to a fallboard or other guide device and thence to beater and picker rolls, peripherally serrated disks or wheels, brushes and other treating devices assembled as a working combination of elements within a casing or housing, the particular details of which need not be described in the present specification as said parts only enter generally and with no particularity in the invention to be herein set forth and claimed.

Obviously, cotton seeds of differently bred and pedigreed plants and grown in different localities vary in size to a considerable degree. So, too, certain lots of seeds to be delinted have more unremoved fiber than others coming from the gin and, naturally, varying the individual size and massed bulk of the seeds. Therefore, unless some provision is made to control and regulate the feeding of the seeds from the receiving hopper according to their size and condition of the fiber or lint thereon, there is a tendency of choking and jamming the throat or feed opening leading to the initial treating device or element of the machine. To this end, the present invention has been brought about.

One object of the invention is to provide a simple and efficient regulator means which is readily adaptable for installation in an ordinary cotton seed delinting machine without any material alteration or reconstruction, if any, of the seed treating and delinting mechanism.

Another important object is to provide for adjustment of the regulator means, at will, by a manually manipulable controlling and setting device located conveniently externally of the machine.

A further object is to provide external indicator means in connection with the manipulating means to determine the respective adjustments.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a partial sectional view of the upper seed receiving and feed controlling portion of a delinting machine, showing a preferred form and arrangement of the regulating means in accordance with the invention;

Figure 2 is a fragmentary cross-section of the casing or housing of the machine, showing the feeding regulator plate in front elevation, middle portions being broken away to foreshorten the view; the section being taken substantially on the line 2—2 of Figure 1;

Figure 3 is a fragmentary section, on an enlarged scale, taken on or about the line 3—3 of Figure 1, showing details of the feeder roll and the cam and adjusting and setting elements for the regulator plate;

Figure 4 is an outer face view of one side of the casing or housing of the machine, showing the external manipulating and setting element for the regulator plate, and a portion of the casing or housing being broken away to expose portions of the feeder roll and regulator plate; and Figure 5 is an illustration of a modification of the manipulating knob or handle element holding and releasing means.

Referring now to the drawing, the numeral 1 designates generally an ordinary cotton seed delinting machine having, as shown, a receiving hopper 2 for the seeds to be delinted, usually seeds that have been previously stripped of the major portion of their fibers in a regular cotton gin. Below the hopper 2, as shown, is an inclined fallboard or chute 3 for directing the seeds fed from the hopper to the initial treating device or element in the train that effects the stripping of the short fibers or lint from the pre-ginned seeds, the details of which elements need not necessarily be described for a full understanding of the present invention.

Extending transversely of the receiving hopper 2, near the bottom thereof, is a feeder roll 4, which, as shown, comprises a plurality of peripherally recessed or toothed disks, the abutting disk being staggered with respect to each adjacent one, whereby the recesses between the respective teeth provide pockets into which the seeds enter and are thereby carried positively towards the regulator plate of the device of the present invention which will now be described.

The feed regulator preferably comprises a smooth surfaced plate 5, extending transversely of the hopper 2, substantially parallel with the feeder roll, and it constitutes, in effect, the rear wall of the hopper. Said plate extends vertically from the top of the hopper down to a plane slightly below the axis of the feeder roll. As shown, the plate 5 is carried by a substantially rectangular frame whose top horizontal member 6 and bottom member 7 are of angle iron section, preferably L-shape. The vertical end members of the frame, designated generally by the numeral 8, have their upper portions 9 of L-shape in cross-section, but the lower portions 10 thereof are of channel section or substantially U-shape in cross-section. Preferably, the plate 5 is welded to the frame members 6, 7 and 8, but said parts may be obviously joined together by bolting or riveting, or even formed integrally by other approved process.

Said carrying frame for the regulator plate 5 is hinged on a cross rod or shaft 11 which is mounted at its opposite ends on the side walls of the hopper 2. Said frame is normally depended vertically from the rod or shaft 11 with the lower portion of the plate 5 in spaced relation to the periphery of the feeder roll 4 as shown in Figure 1 of the drawing, which normal spaced relation is sufficient throat clearance or feed opening for the seeds to be delinted under certain graded size and condition of the seeds. However, some adjustment and regulation of the throat or feed opening is desirable, and even necessary, to secure the proper feeding of the seeds of different sizes and condition of the fiber thereon, and not only the difference in size according to breed and pedigree of the plants and weather conditions during growth, but, obviously, the bulk of the un-delinted seeds is appreciably affected by atmospheric conditions, that is to say, the bulk is increased due to absorption of moisture by the fiber, and decreased by loss of moisture.

The present invention comprehends a swingable adjustment of the regulator plate 5 towards and from the feeder roll 4, by which adjustment an ideal regulation of the feed is attained. That is to say, by swinging the plate away from the feeder roll, an opening of definite width therebetween is afforded in the horizontal plane of the axis of the feeder roll, and at the same time, due to the inclination of the plate, the lower portion of the plate below said horizontal plane is moved relatively farther from the feeder roll, thereby providing ample clearance for seeds passing between the roll and plate. So, too, the upper portion of the plate is moved proportionately farther from the feeder roll. By the same token, when the regulator plate 5 is adjusted closer towards the feeder roll 4 in the horizontal plane of the axis of the roll, the portions of the plate above and below the said horizontal plane are proportionately closer to said roll.

To effect the adjustment of the regulator plate 5 cam elements 12 are preferably utilized, said cams being located adjacent to the respective end members 8 of the carrying frame and working peripherally between the flanges of the channeled lower portions 10 of said frame members (see Figures 1 and 3). As shown, the cam elements 12 are secured by set-screws 12' on a shaft 13 which extends through transverse slots 8' in the frame members 8 and is journaled in bearings 14, 15, in the side walls of the receiving hopper 4. One end of the shaft 13 extends outside of the adjacent side wall of the hopper and is provided with a knob or handle member 16, by manipulation of which, said shaft is rotated and the cam elements 12 accordingly turned to move the regulator plate 5.

Preferably, as shown in Figure 3, the meeting faces of the shaft bearing 15 and said knob or handle element 16 are notched or serrated, as at 17, for interlocking engagement when brought together, whereby the shaft 13 is held against rotation and the cam elements 12 are locked in their set or adjusted position. As shown in Figure 3, a spring element 18 is interposed between one of the cam elements 12 and the adjacent wall of the hopper, normally under tension and functioning to releasably hold the knob or handle element 16 in its interlocked engagement with the shaft bearing extension 15, by which provision the shaft 13 with the cam elements 12 thereon is readily pulled endwise to effect the disengagement of the toothed portions 17 by an operator grasping said knob or handle element 16, and after the rotative adjustment is effected the spring element 18 re-acts to move said shaft and cam elements reversely endwise and the knob or handle element 16 back into engagement with the shaft bearing extension 15 when the operator releases his hold on said knob or handle element.

Obviously, as illustrated in Figure 5 of the drawing, instead of moving the shaft 13 and cam elements 12 endwise, as just above described, to effect the adjustment of the regulator plate 5, the shaft may be journaled immovably endwise, and the knob or handle member 16 keyed or splined in an approved manner as at 16' on the outer end portion of said shaft 13, in which modification the knob or handle element 16 may be normally urged to engage the shaft bearing 15 by a spring element 19 interposed between said knob or handle element and a thrust collar or shoulder 20 on the shaft.

By having the cam elements 12 normally in the position with their longest transverse axes vertical, as shown in Figure 1 of the drawing, the regulator plate 5 is accordingly in a neutral vertical position. Hence, by turning the cam elements in either direction the regulator plate is moved towards or from the feeder roll 4, at will, and the adjustment is retained, in a simple and practical way, by the interlocking engagement of the knob or handle element 16 as hereinabove described. To enable the operator to readily determine the adjusted position of the feed regulator plate 5 from the outside, an indicator dial 21 is preferably provided on the knob member 16 and suitably marked with indicia, such as lines and numbers for example, to register with a stationary mark 22 in correlation to the knob member and indicative of position.

Obviously, the structure and adaptation of the regulating means may be changed in many particulars within the spirit and scope of the invention as defined in the appended claims. The invention, therefore, is not limited to the specific construction and arrangement shown in the accompanying drawing.

What I claim and desire to secure by Letters Patent, is:

1. The herein described feed regulating means for cotton seed linters, comprising a feeder roll, a substantially vertically disposed regulator plate spaced in opposed relation at one side of said feeder roll to regulate the opening through which the seeds are fed to the delinting devices and elements of the machine, said plate being hingedly supported at its upper portion, channeled members on said regulator plate, cam elements working peripherally in said channeled members, means including a manipulable element located externally of the machine for rotating said cam elements to swing said regulator plate towards and from said feeder roll, and means for releasably holding said cam elements in their respective actuated positions and said regulator plate in its adjusted relation to said feeder roll.

2. The herein described feed regulating means for cotton seed linters, comprising a feeder roll, a substantially vertically disposed regulator plate spaced in opposed relation at one side of said feeder roll to regulate the opening through which the seeds are fed to the delinting devices and elements of the machine, said plate being hingedly supported at its upper portion, channeled members on said regulator plate, cam elements working peripherally in said channeled members, means including a manipulable element located externally of the machine for rotating said cam elements to swing said regulator plate towards and from said feeder roll, means for releasably holding said cam elements in their respective actuated positions and said regulator plate in its adjusted relation to said feeder roll, said manipulable element comprising a knob member, and the releasable holding means for said cam elements and said regulator plate comprising an interlocking abutment member fixed on a stationary part of the machine, a counterpart portion on said knob member, and a spring element normally urging said knob member into engagement with said abutment member.

3. Feed regulating means for cotton seed linters comprising, a receiving hopper for the seeds to be delinted, a transverse horizontal feeder roll located within and extending from side to side of the hopper, an opposed feed regulator plate hingedly supported at its upper marginal portion and disposed in a normally neutral vertical position in spaced relation to the circumference of said feeder roll and swingably adjustable towards and from the roll in angular position approximating the normally neutral vertical position in either direction, a vertical guideway on said feed regulator plate, a cam element located in said guideway with its long axis normally vertical for moving said feed regulator plate to its adjusted positions and for holding said plate in its normally neutral and adjusted positions, an operating and holding shaft for said cam element, and means externally of the machine for manipulating said shaft and locking it in its rotated positions.

CHARLES R. CARR.